(12) United States Patent
Tsubaki et al.

(10) Patent No.: US 12,139,213 B2
(45) Date of Patent: Nov. 12, 2024

(54) CONTROL APPARATUS OF STEERING SYSTEM FOR VEHICLES

(71) Applicant: NSK LTD., Tokyo (JP)

(72) Inventors: Takahiro Tsubaki, Maebashi (JP); Ryo Minaki, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/776,438

(22) PCT Filed: Feb. 3, 2022

(86) PCT No.: PCT/JP2022/004200
§ 371 (c)(1),
(2) Date: May 12, 2022

(87) PCT Pub. No.: WO2022/254785
PCT Pub. Date: Dec. 8, 2022

(65) Prior Publication Data
US 2024/0158001 A1 May 16, 2024

(30) Foreign Application Priority Data
Jun. 3, 2021 (JP) .................................. 2021-093540

(51) Int. Cl.
*B62D 5/04* (2006.01)
*B62D 6/00* (2006.01)

(52) U.S. Cl.
CPC ............. *B62D 5/046* (2013.01); *B62D 6/002* (2013.01); *B62D 6/008* (2013.01)

(58) Field of Classification Search
None
See application file for complete search history.

(56) References Cited

U.S. PATENT DOCUMENTS

| | | | |
|---|---|---|---|
| 8,406,958 B2 * | 3/2013 | Kim .................... | B62D 9/00 701/41 |
| 9,327,761 B2 * | 5/2016 | Tsubaki .................... | B62D 6/08 |
| 9,821,837 B2 * | 11/2017 | Kitazume ............ | B62D 5/0466 |
| 10,086,866 B2 * | 10/2018 | Minaki ................ | B62D 5/0463 |
| 10,919,567 B2 * | 2/2021 | Kitazume ............ | B62D 5/0463 |
| 11,251,731 B2 * | 2/2022 | Endo .................... | H02P 6/10 |
| 2013/0018550 A1 * | 1/2013 | Kim .................... | B62D 9/00 701/41 |
| 2016/0001810 A1 * | 1/2016 | Tsubaki ................ | B62D 6/08 701/42 |

(Continued)

FOREIGN PATENT DOCUMENTS

| | | | |
|---|---|---|---|
| CN | 101332834 A | * 12/2008 | ............. B62D 5/046 |
| CN | 104590362 A | * 5/2015 | ........... B62D 5/0457 |

(Continued)

OTHER PUBLICATIONS

Extended European Search Report issued Nov. 15, 2023 in European Application No. 22720281.9.

*Primary Examiner* — Kevin R Steckbauer
(74) *Attorney, Agent, or Firm* — Sughrue Mion, PLLC

(57) ABSTRACT

A control apparatus of a steering system for vehicles that precisely compensates an influence of the friction generated in the turning mechanism and enables a vehicle to respond properly. The control apparatus controls a turning mechanism by drive-controlling a turning actuator based on steering information communicated electrically.

14 Claims, 12 Drawing Sheets

(56) References Cited

U.S. PATENT DOCUMENTS

| | | | | |
|---|---|---|---|---|
| 2017/0183028 A1* | 6/2017 | Kitazume | ............ | B62D 5/0466 |
| 2018/0178832 A1* | 6/2018 | Minaki | ............ | B62D 15/0235 |
| 2018/0339725 A1* | 11/2018 | Kodera | ................ | B62D 5/046 |
| 2020/0298904 A1* | 9/2020 | Kitazume | ............ | B62D 5/0463 |
| 2021/0044234 A1* | 2/2021 | Endo | ........................ | H02P 6/10 |
| 2022/0135117 A1* | 5/2022 | Tsubaki | ................ | B62D 6/002 |
| | | | | 180/402 |
| 2024/0158001 A1* | 5/2024 | Tsubaki | ................ | B62D 6/002 |

FOREIGN PATENT DOCUMENTS

| | | | | | |
|---|---|---|---|---|---|
| CN | 105246764 A | * | 1/2016 | ............. | B62D 1/28 |
| CN | 105246764 B | * | 6/2017 | ............. | B62D 1/28 |
| CN | 107054448 A | * | 8/2017 | .......... | B62D 5/0466 |
| CN | 105579325 B | * | 9/2017 | .......... | B62D 5/0466 |
| CN | 106794864 B | * | 4/2019 | ............. | B62D 15/02 |
| CN | 113348126 A | * | 9/2021 | ............. | B62D 5/046 |
| CN | 111315637 B | * | 3/2022 | ............. | B62D 5/0463 |
| CN | 113348126 B | * | 2/2024 | ............. | B62D 5/046 |
| DE | 112020001971 T5 | * | 1/2022 | ............. | B62D 5/046 |
| EP | 2977296 A1 | * | 1/2016 | ............... | B62D 1/28 |
| EP | 2977296 B1 | * | 7/2018 | ............... | B62D 1/28 |
| EP | 3406506 A1 | * | 11/2018 | .......... | B62D 5/0421 |
| EP | 4122801 A1 | * | 1/2023 | ............. | B62D 5/046 |
| JP | 2004130965 A | * | 4/2004 | ............... | B60T 8/172 |
| JP | 2004268659 A | * | 9/2004 | ............... | B62D 5/008 |
| JP | 3901928 B2 | * | 4/2007 | ............. | B62D 5/0466 |
| JP | 4120427 B2 | * | 7/2008 | ............. | B62D 5/008 |
| JP | 4248739 B2 | * | 4/2009 | ......... | B62D 15/0245 |
| JP | 2010-137742 A | | 6/2010 | | |
| JP | 2018199477 A | * | 12/2018 | .......... | B62D 5/0421 |
| JP | 2020175770 A | * | 10/2020 | ............. | B62D 5/046 |
| JP | 2021-031054 A | | 3/2021 | | |
| JP | 7170971 B2 | * | 11/2022 | ............. | B62D 5/046 |
| JP | 7223306 B1 | * | 2/2023 | ............. | B62D 5/046 |
| JP | 2023159537 A | * | 11/2023 | | |
| WO | WO-2016017235 A1 | * | 2/2016 | .......... | B62D 5/0466 |
| WO | WO-2019082271 A1 | * | 5/2019 | ............. | B62D 5/0463 |
| WO | WO-2020213286 A1 | * | 10/2020 | ............. | B62D 5/046 |
| WO | WO-2022254785 A1 | * | 12/2022 | ............. | B62D 5/046 |

* cited by examiner

CONTROL APPARATUS OF STEERING SYSTEM FOR VEHICLES

CROSS REFERENCE TO RELATED APPLICATIONS

This application is a National Stage of International Application No. Entry of PCT/JP2022/004200 filed Feb. 3, 2022, claiming priority based on Japanese Patent Application No. 2021-093540 filed Jun. 3, 2021.

TECHNICAL FIELD

The present invention relates to a control apparatus of a steering system for vehicles such as a steer-by-wire (SBW) system where a steering mechanism and a turning mechanism are separated mechanically, and in particular to a control apparatus of a steering system for vehicles that controls the turning mechanism by using information such as a steering angle communicated electrically.

BACKGROUND ART

As one of steering systems for vehicles, there is a steer-by-wire (SBW) system where a steering mechanism having a steering wheel (handle) operated by a driver and a turning mechanism to turn turning wheels are separated mechanically. The SBW system communicates an operation of the steering wheel to the turning mechanism by an electric signal, and generates a steering reaction force to give an appropriate steering feeling to the driver in the steering mechanism. The steering mechanism generates a steering reaction force by a reaction actuator having a reaction motor, and the turning mechanism turns the turning wheels by a turning actuator having a turning motor.

In such a SBW system, it needs to accurately transmit the operation of the steering wheel by the driver to the turning mechanism, and the turning mechanism needs to properly turn the turning wheels. Unfortunately, in a case that a target turning angle being a target value of a turning angle changes slightly, such as a situation that the driver slightly turns the steering wheel, the turning angle comes to follow the target turning angle late by a friction occurring in the turning mechanism, a vehicle does not properly move in the steering direction, and some inconvenient matters may occur.

In Japanese Unexamined Patent Publication No. 2020-175770 (Patent Document 1), the control apparatus of steering system foe vehicles to compensate the follow-up delay of the turning angle against the target turning angle due to the friction as described above, is disclosed. In the control apparatus disclosed in Patent Document 1, the follow-up delay is compensated by the compensation due to the compensation motor current command value calculated with velocity information of the target turning angle velocity and so on.

THE LIST OF PRIOR ART DOCUMENTS

Patent Documents

Patent Document 1: Japanese Unexamined Patent Publication No. 2020-175770 A

SUMMARY OF THE INVENTION

Problems to Be Solved by the Invention

However, in a case that a load is applied to the turning mechanism, such as a situation the steering wheel is widely steered, the friction often becomes large. Since the control apparatus disclosed in Patent Document 1 fears those measures are not sufficient, there is a risk that the compensation of the follow-up delay becomes insufficient.

The present invention has been developed in view of the above-described circumstances, and an object of the present invention is to provide a control apparatus of a steering system for vehicles that precisely compensates the influence of the friction generated at the turning mechanism and enables a vehicle to respond properly.

Means for Solving the Problems

The present invention relates to a control apparatus of a steering system for vehicles that controls a turning mechanism by driving and controlling a turning actuator based on steering information communicated electrically, and the above-described object of the present invention is achieved by that comprising a turning angle control section that calculates a current command value to make a turning angle detected in the turning mechanism follow a target turning angle, wherein the turning angle control section comprises a friction compensating section that calculates a compensation current command value for compensating a follow-up delay of the turning angle caused by a friction in the turning mechanism by using velocity information in the turning mechanism and driving information relating to a drive of the turning actuator, wherein the turning angle control section performs compensation by the compensation current command value in a calculation of the current command value, wherein a compensation due to the compensation current command value is performed in the calculation, and wherein the turning actuator is driven and controlled by using the current command value.

Further, the above-described object of the present invention is efficiently achieved by that wherein the friction compensating section comprises a filter section that calculates corrected velocity information and corrected driving information by performing the filter processing to the velocity information and the driving information; and a conversion map section that converts the corrected velocity information into the compensation current command value in accordance with the corrected velocity information by using a conversion map, or wherein the filter processing is performed based on followability of an actual velocity to a target velocity in a velocity control at the turning angle control section, or wherein the conversion map has a characteristic to become large and converge to a predetermined value as the corrected velocity information becomes large, or wherein the conversion map has a characteristic to become large as the corrected driving information becomes large, or wherein the friction compensating section further comprises an output gain section that multiplies the compensation current command value by a gain, or wherein the driving information is the current command value, or wherein the velocity information is a target turning angular velocity corresponding to the target turning angle or a turning angular velocity corresponding to the turning angle, or wherein the turning angle control section further comprises a turning angle feedback compensating section that calculates a target turning angular velocity from a deviation between the target turning angle and the turning angle, a turning angular velocity calculating section that calculates a turning angular velocity from the turning angle, and a velocity control section that calculates a basic current command value based on the target turning angular velocity and the turning angular velocity, wherein the current command value is calculated by compensating the basic current command value by the compensation current command value, or wherein the turning angle control section further comprises an output limiting section that limits upper and lower limit values of the current command value, or further comprising a target turning angle generating section that generates the target turning angle based on the steering information, or wherein the target turning angle generating section generates the target turning angle by reducing a component corresponding to a predetermined component of the turning angle in the steering information, or wherein the target turning angle generating section generates the target turning angle to make a virtual stroke ratio obtained in accordance with the steering information and the target turning angle variable.

Effects of the Invention

The control apparatus of the steering system for vehicles according to the present invention can compensate the delay due to the friction caused in the turning mechanism while the turning angle follows the target turning angle, with the consideration of the load applied to the turning mechanism, by calculating the compensation current command value by using the driving information in addition to the velocity information, and by performing the compensation due to the calculated compensation current command value. Accordingly, the present invention can increase the compensation accuracy and enables the vehicle to respond properly.

MODE FOR CARRYING OUT THE INVENTION

The present invention is a control apparatus to control a turning mechanism, and performs compensation of a follow-up delay (hereinafter, referred to as "friction compensation") of a turning angle against a target turning angle on the basis of a friction generated in a turning mechanism. For this purpose, the present invention performs the compensation by a compensation current command value calculated by using a velocity information in the turning mechanism such as a target turning angular velocity and a driving information relating to a driving of a turning motor such as a current command value in calculation of the current command value being a command to a turning motor. Since the friction in the turning mechanism depends on a turning state of the turning wheels, the velocity information such as a target turning angular velocity is used in the calculation of the compensation current command value. Further, in a case that the load applied to the turning mechanism is great, the friction also tends to become great. For example, the load is great in a case that the driving information is great. Since it is possible to grasp the load applied to the turning mechanism based on the driving information such as the current command value, the driving information is also used in the calculation of the compensation current command value. Thereby, the friction compensation considered an actually closer friction can be performed.

Hereinafter, embodiments of the present invention will be described with reference to the accompanying drawings.

First, a configuration example of an SBW system including the control apparatus of the present invention will be described.

Figure 1:
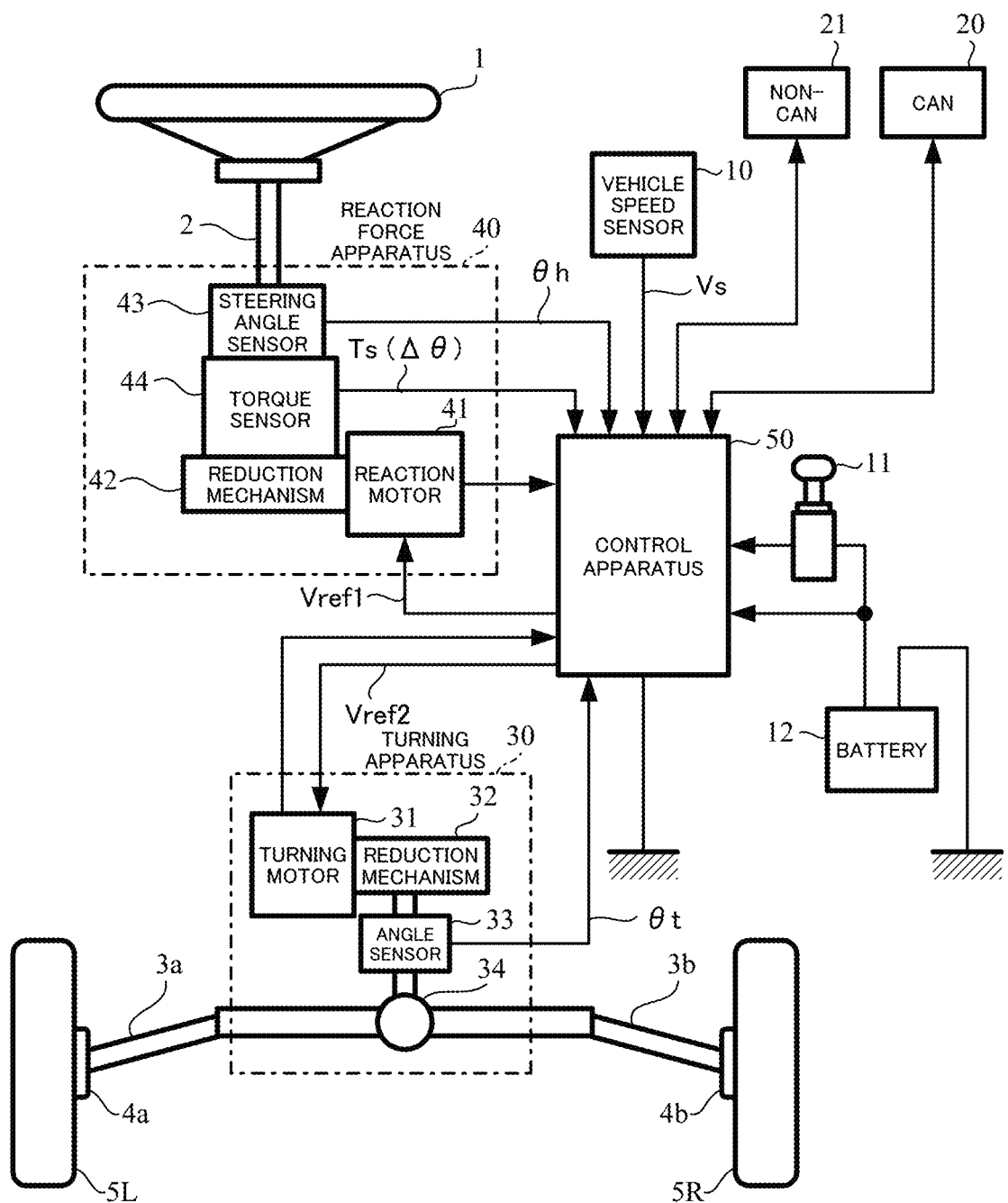
FIG. 1 is a configuration diagram illustrating a general outline example of an SBW system including a control apparatus of the present invention.

FIG. 1 is a diagram showing the configuration example of the SBW system. The SBW system includes a reaction force apparatus 40 constituting a steering mechanism having a steering wheel (a handle) 1 operated by a driver, a turning apparatus 30 constituting a turning mechanism to turn the turning wheels, and a control apparatus 50 to control both apparatuses. The SBW system does not have an intermediate shaft that a general electric power steering apparatus includes and that is mechanically connected with a column shaft (a steering shaft or a handle shaft) 2. The SBW system communicates an operation of the steering wheel 1 by the driver by an electric signal, specifically, communicates a steering angle θh being the steering information outputted from the reaction force apparatus 40 as the electric signal.

The turning apparatus 30 includes a turning motor 31, a reduction mechanism 32 to reduce a rotational velocity of the turning motor 31, and a rack-and-pinion mechanism 34 to convert a rotational motion to a linear motion. The turning apparatus 30 drives the turning motor 31 in accordance with a change of the steering angle θh, applies the driving force to the rack-and-pinion mechanism 34 via the reduction mechanism 32, and turns turning wheels 5L and 5R through tie rods 3a and 3b. An angle sensor 33 is provided in the vicinity of the rack-and-pinion mechanism 34, and detects a turning angle θt of the turning wheels 5L and 5R. A motor angle of the turning motor 31, a position of a rack or the like may be used as the turning angle θt.

As well, although the turning actuator is comprises of the turning motor 31, the reduction mechanism 32 and so on, only the turning motor 31 may be called as the turning actuator hereinafter.

The reaction force apparatus 40 includes a reaction motor 41 and a reduction mechanism 42 to reduce a rotational velocity of the reaction motor 41. The reaction force apparatus 40 transmits a motion state of the vehicle transmitted from the turning wheels 5L and 5R, to a driver as a reaction torque generated by the reaction motor 41. The reaction force apparatus 40 further includes a steering angle sensor 43 and a torque sensor 44 with which the column shaft 2 having a torsion bar (not shown) is equipped. The steering angle sensor 43 and the torque sensor 44 detect the steering angle $\theta h$ and a steering torque Ts of the steering wheel 1 (or a torsional angle $\Delta\theta$ of the torsion bar) respectively.

The control apparatus 50 generates a voltage control command value Vref1 for driving and controlling the reaction motor 41 and a voltage control command value Vref2 for driving and controlling the turning motor 31 on the basis of a vehicle speed Vs detected by a vehicle speed sensor 10 and so on in addition to such information as the steering angle $\theta h$ and the turning angle $\theta t$ that are outputted from the reaction force apparatus 40 and the turning apparatus 30, in order to cooperatively control both apparatuses. The electric power is supplied to the control apparatus 50 from a battery 12, and an ignition key signal is inputted into the control apparatus 50 through an ignition key 11. A controller area network (CAN) 20 exchanging various information of a vehicle is connected to the control apparatus 50, and it is possible to receive the vehicle speed Vs from the CAN 20. Further, it is also possible to connect a non-CAN 21 exchanging a communication, analog/digital signals, a radio wave or the like except for the CAN 20 to the control apparatus 50.

Figure 2:
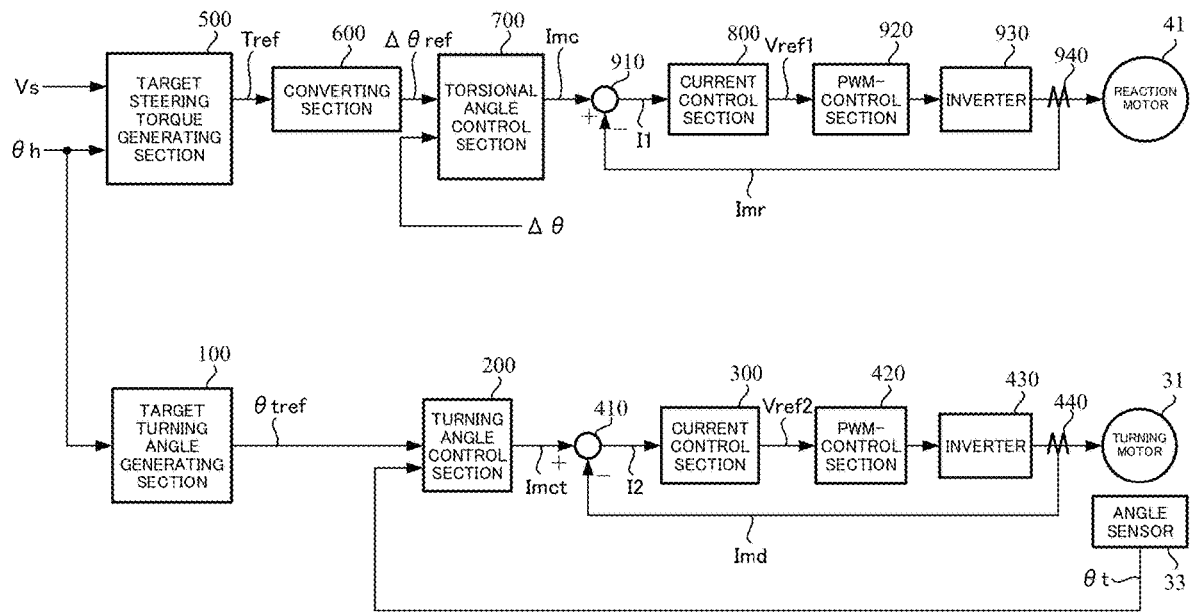
FIG. 2 is a block diagram showing a configuration example of the present invention.

The control apparatus 50 has a central processing unit (CPU) (including a micro controller unit (MCU), a micro processor unit (MPU) and so on). The cooperative control of the reaction force apparatus 40 and the turning apparatus 30 is mainly performed by programs within the CPU. A configuration example (the first embodiment) for performing the control is shown in FIG. 2. In FIG. 2, the reaction force apparatus 40 includes the reaction motor 41, a pulse width modulation (PWM) control section 920, an inverter 930 and a motor current detector 940, the turning apparatus 30 includes the turning motor 31, the angle sensor 33, a PWM-control section 420, an inverter 430 and a motor current detector 440, and other components are achieved by the control apparatus 50.

A part or all of the components of the control apparatus 50 may be achieved by hardware. A random-access memory (RAM), a read-only memory (ROM) and so on may be mounted on the control apparatus 50 to store data, information, a program and so on. Further, the control apparatus 50 may include a part or all of the PWM-control section 920, the inverter 930, the motor current detector 940, the PWM-control section 940, the inverter 430 and the motor current detector 440.

The control apparatus 50 has a configuration for performing a control of the turning apparatus 30 (hereinafter, referred to as "turning control") and a configuration for performing a control of the reaction force apparatus 40 (hereinafter, referred to as "reaction control"). Both configurations cooperatively control the reaction force apparatus 40 and the turning apparatus 30.

The turning control is performed by a target turning angle generating section 100, a turning angle control section 200, and a subtracting section 410. A target turning angle $\theta tref$ is generated on the basis of the steering angle $\theta h$ at the target turning angle generating section 100, the target turning angle $\theta tref$ is inputted into the turning angle control section 200 with the turning angle $\theta t$, and a current command value Imct is calculated at the turning angle control section 200 so that the turning angle $\theta t$ becomes the target turning angle $\theta tref$. A deviation I2 (=Imct−Imd) between the current command value Imct and a current value (a motor current value) Imd of the turning motor 31 detected by the motor current detector 440, is calculated by the subtracting section 410. The voltage control command value Vref2 is obtained at the current control section 300 on the basis of the deviation I2. In the turning apparatus 30, the turning motor 31 is driven and controlled via the PWM-control section 420 and the inverter 430 on the basis of the voltage control command value Vref2.

Figure 3:
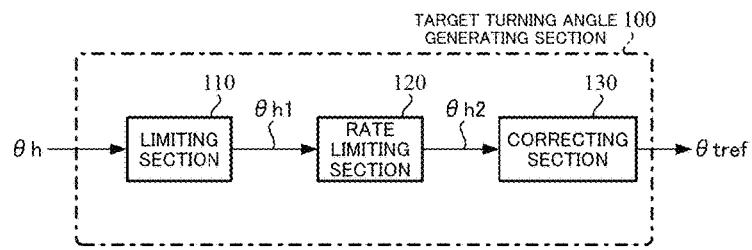
FIG. 3 is a block diagram showing a configuration example of a target turning angle generating section.

A configuration example of the target turning angle generating section 100 is shown in FIG. 3. The target turning angle generating section 100 includes a limiting section 110, a rate limiting section 120 and a correcting section 130.

Figure 4:
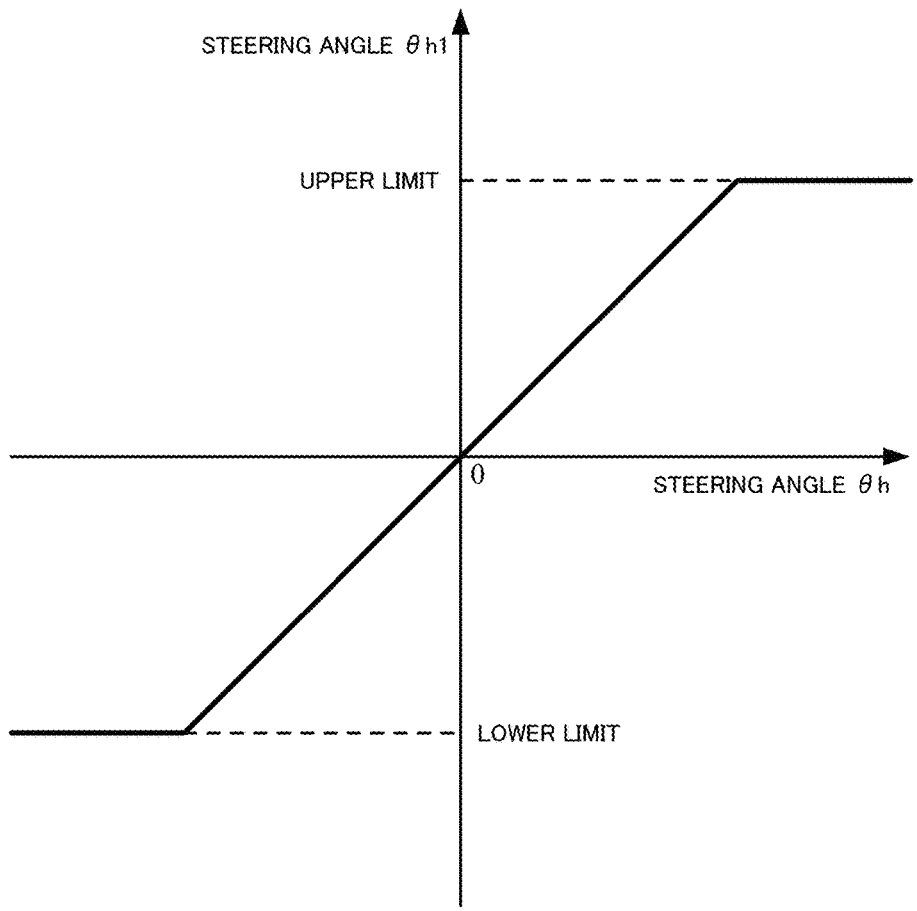
FIG. 4 is a diagram showing an example of setting an upper limit value and a lower limit value in a limiting section.

The limiting section 110 limits upper and lower limit values of the steering angle $\theta h$, and outputs a steering angle $\theta h1$. Limiting the upper and lower limit values of the steering angle $\theta h$ suppresses an output of an abnormal value when the steering angle $\theta h$ becomes an abnormal value due to data corruption in a RAM caused by a hardware error or the like, a communication abnormality and so on. As shown in FIG. 4, the limiting section 110 presets the upper limit value and the lower limit value with respect to the steering angle $\theta h$. In a case that the steering angle $\theta h$ is larger than or equal to the upper limit value, the limiting section 110 outputs the upper limit value as the steering angle $\theta h1$. On the contrary, in a case that the steering angle $\theta h$ is smaller than or equal to the lower limit value, the limiting section 110 outputs the lower limit value as the steering angle $\theta h1$. Otherwise, the limiting section 110 outputs the steering angle $\theta h$, as it is, as the steering angle $\theta h1$.

As well, the limiting section 110 can be removed in some cases such as the case that the steering angle does not become an abnormal value, or the case that another means suppresses the output of the abnormal value.

In the case of steering rapidly, or in the case that the steering angle becomes an abnormal value as described above, the rate limiting section 120 limits a change amount of the steering angle $\theta h1$ by setting a limit value and outputs a steering angle $\theta h2$ in order to prevent an abrupt change in the steering angle. For example, a difference between the present and the previous (1 before sampling) steering angles $\theta h1$ is used as the change amount. When an absolute value of the change amount is larger than a predetermined value (the limit value), addition or subtraction to the steering angle $\theta h1$ is performed so that the absolute value of the change amount becomes the limit value, and the result is outputted as the steering angle $\theta h2$. When the absolute value of the change amount is smaller than or equal to the limit value, the steering angle $\theta h1$ is outputted, as it is, as the steering angle $\theta h2$. Limiting the change amount of the steering angle $\theta h1$ prevents an abrupt change of the target turning angle, and suppresses an unstable motion of the vehicle.

Instead of setting the limit value to the absolute value of the change amount, the limitation may be performed by setting an upper limit value and a lower limit value to the change amount. It is possible to limit a change rate or a difference rate instead of the change amount. Further, the rate limiting section 120 can be removed in some cases such as the case that the steering angle does not change abruptly, or the case that another means avoids the abrupt change.

The correcting section 130 corrects the steering angle θh2, and outputs the target turning angle θtref. For example, the correcting section 130 generates the target turning angle θtref by reducing a predetermined frequency component in the steering angle θh2. As the predetermined frequency component, the correcting section 130, for example, uses a frequency component that is included in frequency components of the turning angle and gives an anxious feeling to the driver, and reduces the frequency component. As the reducing means, the correcting section 130, for example, uses a notch filter having a characteristic of steeply attenuating in a narrow band. The notch filter is designed as a secondary filter. A frequency characteristic of the notch filter is expressed by a transfer function "G" of the following Expression 1 where an attenuation frequency is designated by "fe".

$$G = \frac{\omega_d^2}{\omega_n^2} \frac{s^2 + 2\zeta_n\omega_n s + \omega_n^2}{s^2 + 2\zeta_d\omega_d s + \omega_d^2} \quad \text{[Expression 1]}$$

Here, $\omega_n = \omega_d = 2\pi \times \text{fe}$, "s" is Laplace operator, and "$\zeta_n$" and "$\zeta_d$" are damping coefficients. In this case, an amplitude characteristic is, for example, a characteristic shown in FIG. 5.

Figure 5:
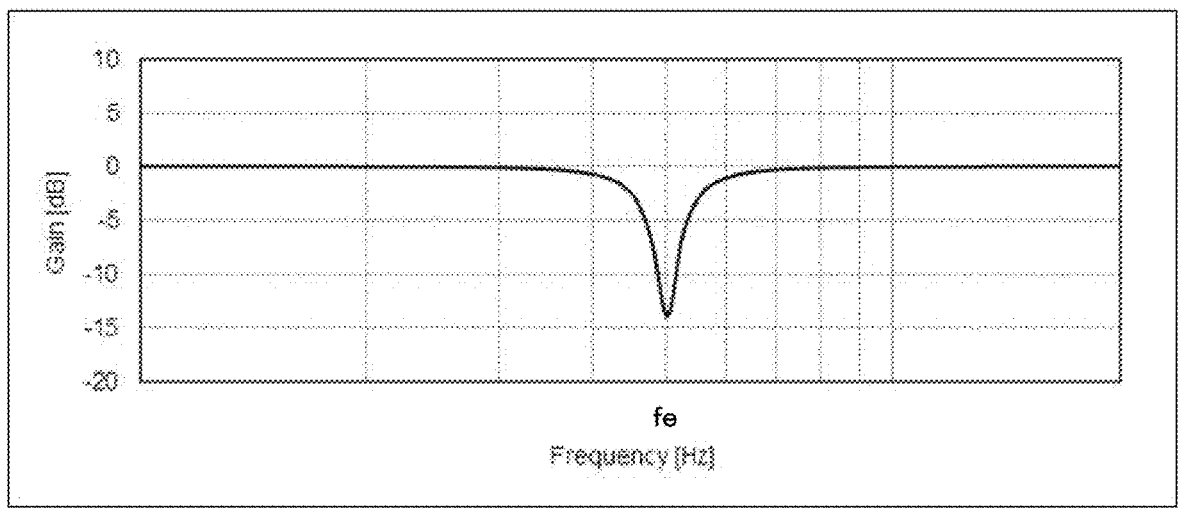
FIG. 5 is a diagram showing an example of a frequency characteristic (an amplitude characteristic) of a notch filter.

In FIG. 5, a horizontal axis shows a frequency [Hz], and a vertical axis shows an amplitude (a gain) [dB]. The amplitude is the smallest at the attenuation frequency "fe". In such a case as the band of the reduced frequency component is not as narrow as a stopband of the notch filter, a band-stop filter other than the notch filter may be used.

Figure 6:
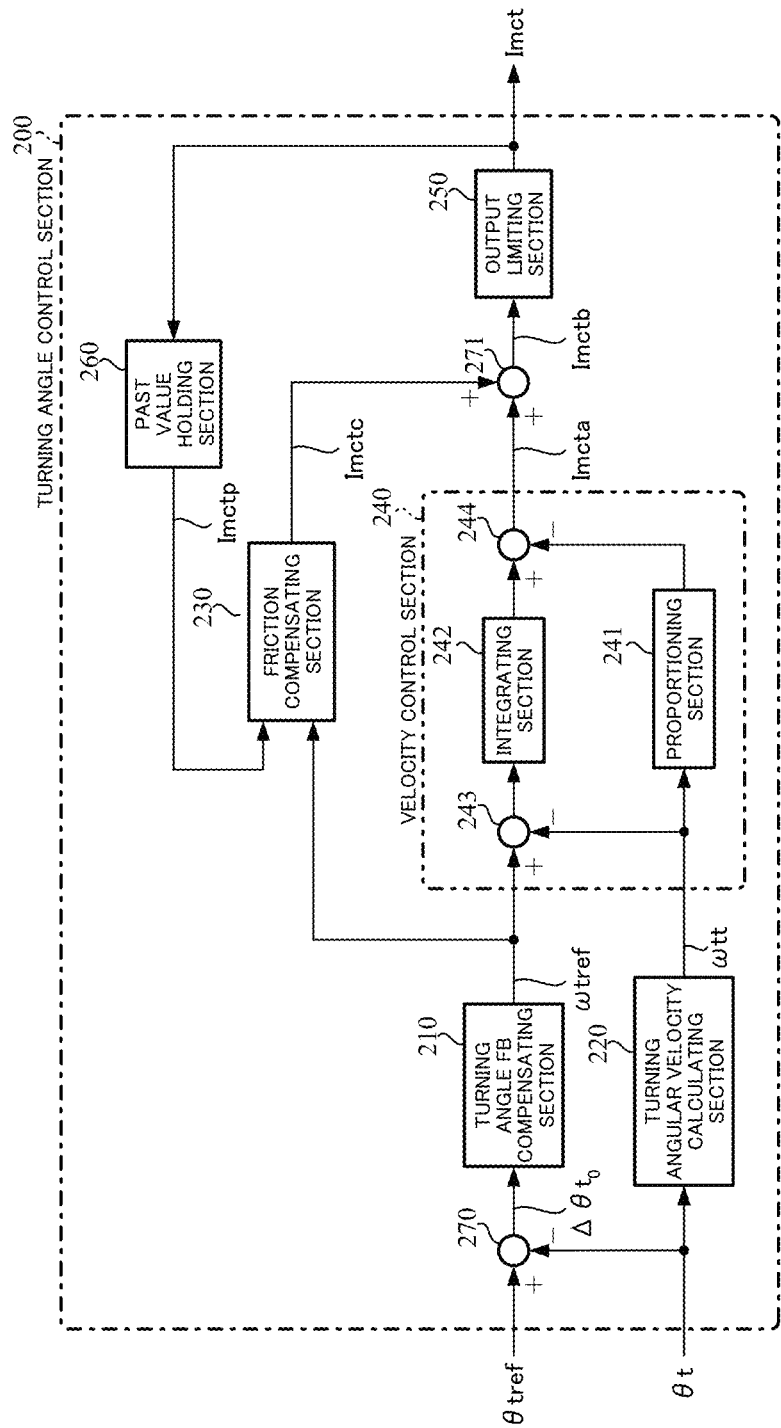
FIG. 6 is a block diagram showing a configuration example (the first embodiment) of a turning angle control section.

The turning angle control section 200 calculates the current command value Imct by the control where the turning angle θt follows the target turning angle θtref. FIG. 6 is a block diagram showing a configuration example of the turning angle control section 200. The turning angle control section 200 includes a turning angle feedback (FB) compensating section 210, a turning angular velocity calculating section 220, a friction compensating section 230, a velocity control section 240, an output limiting section 250, a past value holding section 260, a subtracting section 270 and an adding section 271. The target turning angle θtref outputted from the target turning angle generating section 100 is addition-inputted into the subtracting section 270. The turning angle θt is subtraction-inputted into the subtracting section 270, and is inputted into the turning angular velocity calculating section 220.

The turning angle FB compensating section 210 multiplies a deviation Δθt₀, which is calculated at the subtracting section 270, between the target turning angle θtref and the turning angle θt by a compensation value $C_{FB}$ (a transfer function), and outputs a target turning angular velocity ωtref so that the turning angle θt follows to the target turning angle θtref. The compensation value $C_{FB}$ may be simply a gain Kpp, or may be a compensation value generally used, such as a compensation value of a proportional integral (PI) control. The target turning angular velocity ωtref is inputted into the friction compensating section 230 and the velocity control section 240.

The turning angular velocity calculating section 220 calculates a turning angular velocity ωtt by a differential calculation to the turning angle θt, and the turning angular velocity ωtt is inputted into the velocity control section 240. Pseudo-differential by a high pass filter (HPF) and a gain may be performed as the differential calculation.

The velocity control section 240 performs a velocity control based on a proportional preceding-type PI control (an I-P control), and calculates a current command value (a basic current command value) Imcta that enables followability of the turning angular velocity ωtt (an actual velocity) to the target turning angular velocity ωtref (a target velocity). The velocity control section 240 calculates a difference (ωtref−ωtt) between the target turning angular velocity ωtref and the turning angular velocity ωtt at a subtracting section 243, and integrates the difference at an integrating section 242 having a gain Kvi. The integrated result is addition-inputted into a subtracting section 244. The turning angular velocity ωtt is inputted into a proportioning section 241 also, and a proportional processing by a gain Kvp is performed. The processed result is subtraction-inputted into the subtracting section 244. The subtracted result of the subtracting section 244 is outputted as the current command value Imcta.

As well, the velocity control section 240 may calculate the current command value Imcta by control methods generally used, such as a PI control, a proportional (P) control, a PID control, a differential preceding-type PID control (a PI-D control), a model matching control, a model reference control and so on, instead of the I-P control.

The past value holding section 260 holds the current command value Imct outputted from the turning angle control section 200 in order to use for the calculation of a compensation current command value Imctc at a friction compensating section 230 described later. The past value holding section 260 holds the current command value Imct and obtains a past current command value Imctp based on the current command value Imct being held in order to use for the calculation of the compensation current command value Imctc in a next calculation period. Then, the past current command value Imctp is inputted into the friction compensating section 230. For example, the current command value Imct at a time point "t−1" being a previous calculation period is used as the past current command value Imctp at a time point "t". Alternatively, by holding n current command values Imct from a time point "t−1" to a time point "t−n", a mean value of the n current command values Imct may be used as the past current command value Imctp at a time point "t".

As well, the past value holding section 260 may be integrally built in the friction compensating section 230. Especially, in a case that the current command value Imct at a time point "t−1" is used, just the current command value Imct is temporarily held in a register or the like.

Figure 7:
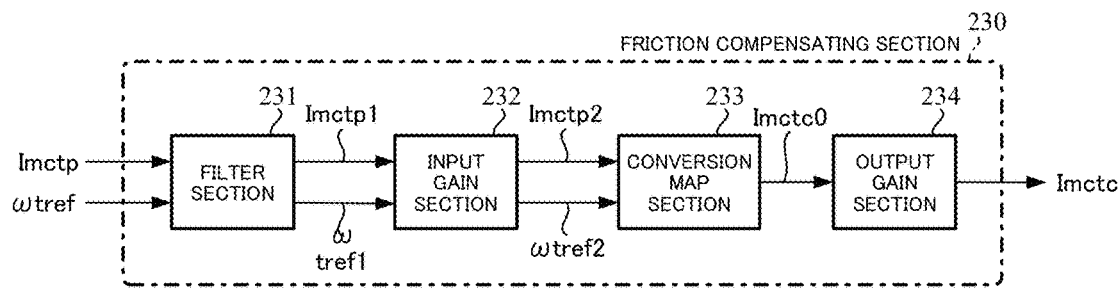
FIG. 7 is a block diagram showing a configuration example (the first embodiment) of a friction compensating section.

The friction compensating section 230 calculates a compensation current command value Imctc for the friction compensation, on the basis of the target turning angular velocity ωtref and the past current command value Imctp, by using the target turning angular velocity ωtref as the velocity information and by using the past current command value Imctp as the driving information. FIG. 7 is a block diagram showing a configuration example of the friction compensating section 230. The friction compensating section 230 includes a filter section 231, an input gain section 232, a conversion map section 233 and an output gain section 234.

The filter section 231 performs a filter processing by a low pass filter (LPF) to the target turning angular velocity ωtref and the past current command value Imctp. The LPF has a characteristic according with followability of the turning angular velocity ωtt to the target turning angular velocity ωtref in the velocity control section 240. In the case of performing it simply, the filter section 231 uses an LPF having a primary delay or secondary delay transfer function, and the LPF is designed so that a time delay caused by the filter processing using the LPF becomes equivalent to a follow-up delay of the turning angular velocity ωtt to the target turning angular velocity ωtref. The target turning angular velocity ωtref after the filter processing is outputted as a target turning angular velocity ωtref1 (corrected velocity information), and the past current command value Imctp after the filter processing is outputted as a past current command value Imctp1 (corrected driving information).

The input gain section 232 respectively multiplies the target turning angular velocity ωtref1 and the past current command value Imctp1 by a gain to improve the accuracy of the processing in the subsequent conversion map section 233. The input gain section 232 outputs the target turning angular velocity after the multiplication as a target turning angular velocity ωtref2 and the past current command value after the multiplication as a past current command value Imctp2. The gain multiplying by the target turning angular velocity ωtref1 and the past current command value Imctp1 may be the same or different.

Figure 8:
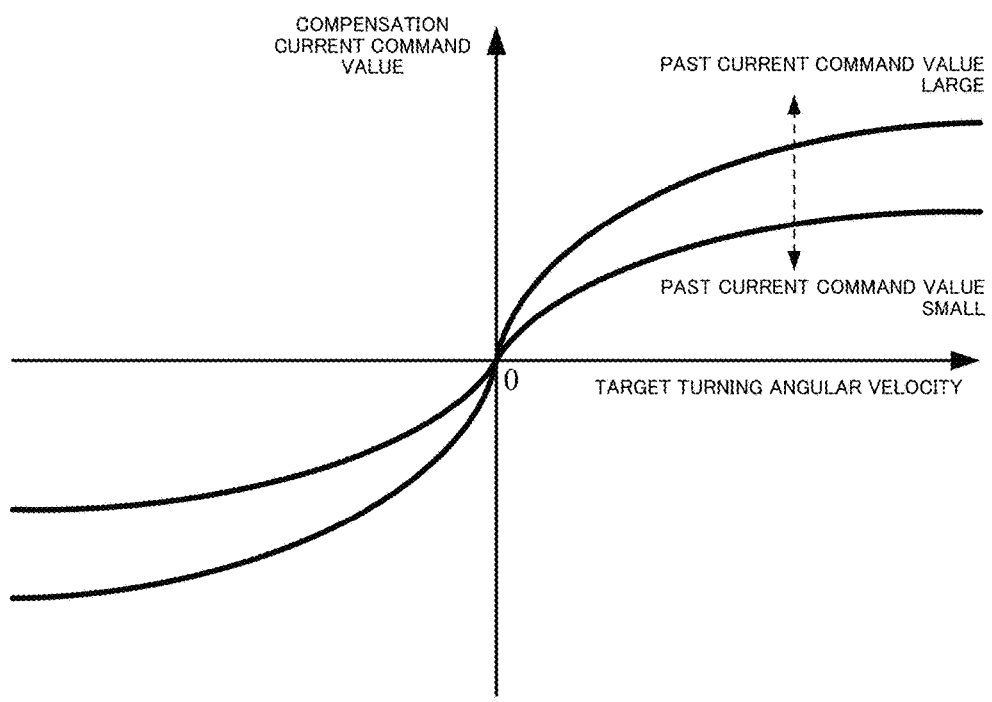
FIG. 8 is a diagram showing a characteristic example of a conversion map.

The conversion map section 233 uses a conversion map defining a characteristic of a current command value to the target turning angular velocity in accordance with the past current command value, and converts the target turning angular velocity ωtref2 into a compensation current command value Imctc0. The characteristic defined in the conversion map is a characteristic where the compensation current command value gradually converges from a predetermined minus value to a predetermined plus value in a case that the turning angular velocity changes from minus infinity (−∞) to plus infinity (+∞). Further, the compensation current command value is variable depending on the past current command value. That is, the larger the past current command value is, the larger the compensation current command value is. The characteristic of the conversion map is, for example, as shown in FIG. 8. This reason is that: the friction in the turning mechanism becomes large as the turning angular velocity becomes fast and does large as the load applied to the turning mechanism becomes large.

The conversion map may be expressed as a mathematical function such as a hyperbolic tangent function or an arctangent function, or as a table.

The output gain section 234 multiplies the compensation current command value Imctc0 by a gain to adjust a degree of the compensation of the current command value performed by adding the compensation current command value, and outputs the compensation current command value after the multiplication as the compensation current command value Imctc.

As well, the filter section 231 and the input gain section 232 may be positioned in the reverse order. It is possible to incorporate the function of the input gain section 232 into the filter section 231 and remove the input gain section 232. It is also possible to incorporate the function of the output gain section 234 into the conversion map section 233 and remove the output gain section 234.

The current command value Imcta outputted from the velocity control section 240 and the compensation current command value Imctc outputted from the friction compensating section 230 are added at the adding section 271. The added result is outputted as a current command value Imctb.

The output limiting section 250 limits upper and lower limit values of the current command value Imctb, and outputs the current command value Imct. As with the limiting section 110 in the target turning angle generating section 100, the output limiting section 250 performs the limitation by presetting the upper limit value and the lower limit value with respect to the current command value Imctb. The current command value Imct is inputted into the past value holding section 260 and the subtracting section 410.

As with the limiting section 110, the output limiting section 250 can be removed in some cases such as the case that the current command value does not become an abnormal value, or the case that another means suppresses the output of the abnormal value.

The current command value Imct is addition-inputted into the subtracting section 410. The deviation I2 between the current command value Imct and the motor current value Imd being fed back is calculated at the subtracting section 410. The deviation I2 is inputted into the current control section 300. The current control section 300 performs a current control by the PI control or the like, and outputs the voltage control command value Vref2 to which the current control is applied.

The voltage control command value Vref2 calculated in the control apparatus 50 is sent to the turning apparatus 30, and is inputted into the PWM-control section 420, where a duty ratio is calculated. The turning motor 31 is PWM-driven through the inverter 430 in accordance with a PWM signal outputted from the PWM-control section 420. The motor current value Imd of the turning motor 31 is detected by the motor current detector 440, and is fed back to the subtracting section 410 in the control apparatus 50.

The control is performed that the turning angle θt follows the target turning angle θtref in the turning control, while the control is performed that the torsional angle Δθ of the torsion bar follows a target torsional angle Δθref in the reaction control. The reaction control is performed by a target steering torque generating section 500, a converting section 600, a torsional angle control section 700, a current control section 800 and a subtracting section 910. A target steering torque Tref is generated at the target steering torque generating section 500 on the basis of the steering angle θh and the vehicle speed Vs. The target steering torque Tref is converted into the target torsional angle Δθref at the converting section 600. The target torsional angle Δθref is inputted into the torsional angle control section 700 with the torsional angle Δθ. The torsional angle control section 700 calculates a current command value Imc so that the torsional angle φθ becomes the target torsional angle Δθref. A deviation I1 (=Imc−Imr) between the current command value Imc and a current value (a motor current value) Imr of the reaction motor 41 detected by the motor current detector 940, is calculated by the subtracting section 910. The voltage control command value Vref1 is obtained at the current control section 800 on the basis of the deviation I1. In the reaction force apparatus 40, the reaction motor 41 is driven and controlled via the PWM-control section 920 and the inverter 930 on the basis of the voltage control command value Vref1.

The torsional angle Δθ of the torsion bar may be obtained as a difference between an angle detected by an upper side angle sensor disposed on the steering wheel side of the column shaft 2 and an angle detected by a lower side angle sensor disposed on the opposite side across the torsion bar, or may be obtained by converting the steering torque Ts.

Figure 9A:
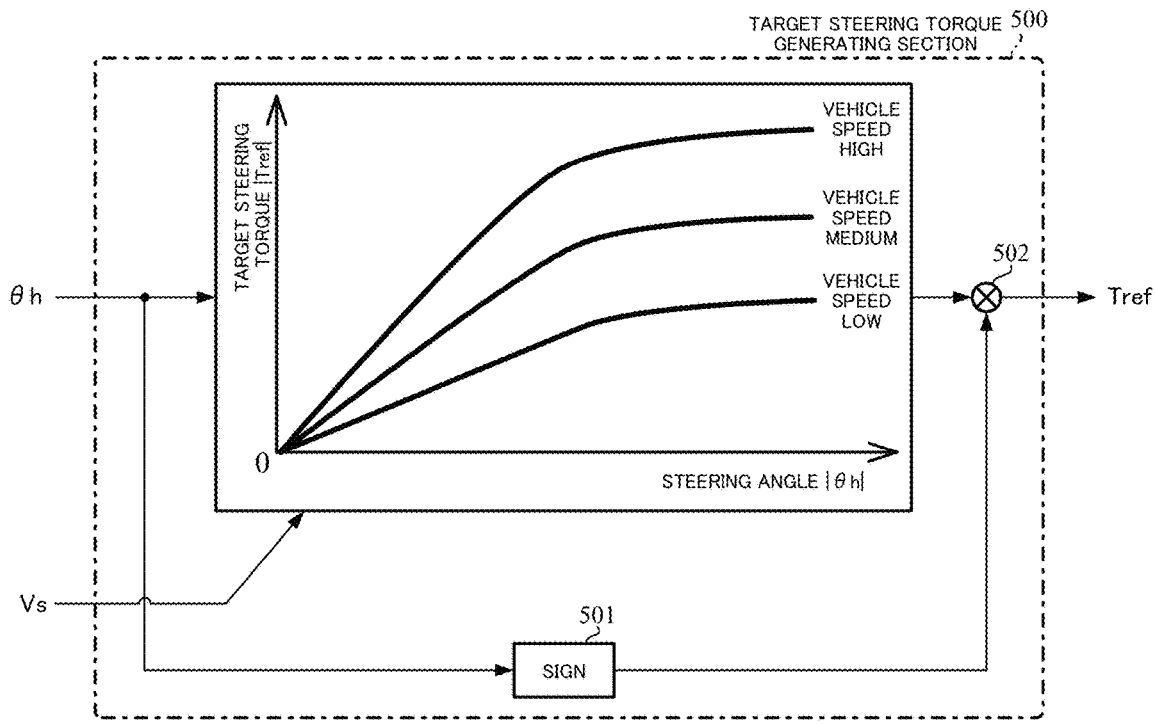
FIGS. 9A and 9B are diagrams showing a configuration example of a target steering torque generating section and a characteristic example of a basic map.
Figure 9B:
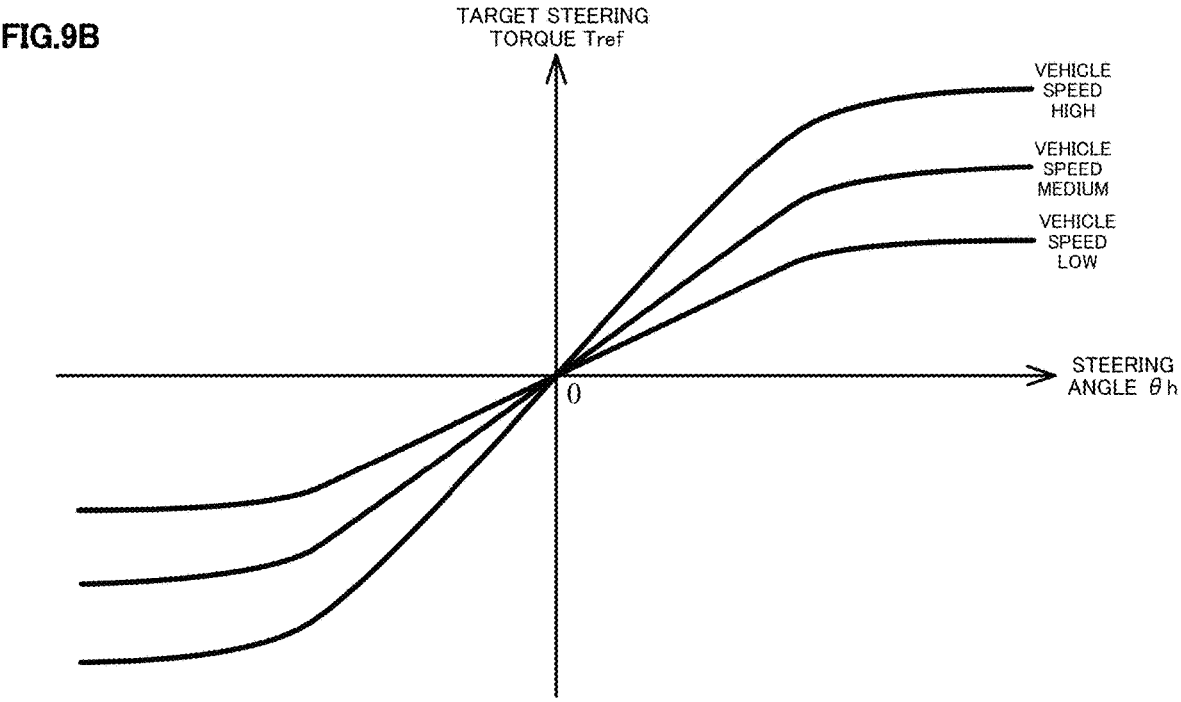

The target steering torque generating section 500 has a basic map, and outputs the target steering torque Tref including the vehicle speed Vs as a parameter by using the basic map. The basic map has been adjusted by tuning. For example, as shown in FIG. 9A, the target steering torque Tref increases as a magnitude (an absolute value) |θh| of the steering angle θh increases, and increases also as the vehicle speed Vs increases. FIG. 9A shows a configuration where a sign section 501 outputs a sign (+1, −1) of the steering angle θh to a multiplying section 502, a magnitude of the target steering torque Tref is obtained from the magnitude of the steering angle θh by using a map, the magnitude of the target steering torque Tref is multiplied by the sign of the steering angle θh, and the target steering torque Tref is obtained. Alternatively, as shown in FIG. 9B, the map may be configured depending on a positive and a negative steering angles θh. In this case, the mode of variation may be changed depending on whether the steering angle θh is positive or negative. Although the basic maps shown in FIGS. 9A and 9B are vehicle speed sensitive, the basic map may not be vehicle speed sensitive.

The converting section 600 has a characteristic of "−1/Kt" obtained by inverting the sign of the reciprocal of a spring constant Kt of the torsion bar, and converts the target steering torque Tref into a target torsional angle Δθref.

Figure 10:
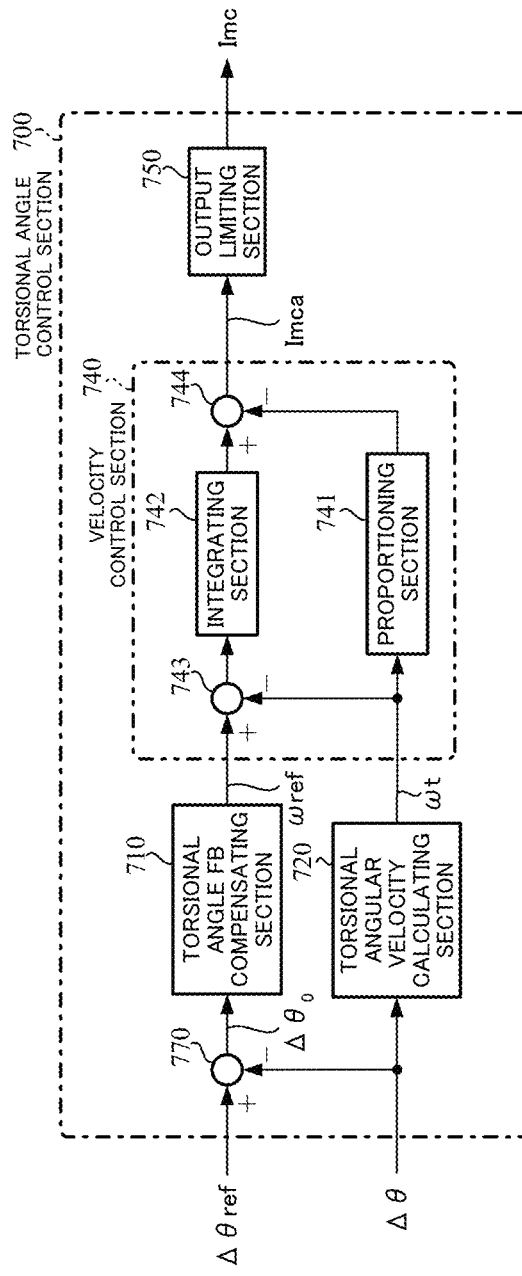
FIG. 10 is a block diagram showing a configuration example of a torsional angle control section.

A configuration example of the torsional angle control section 700 is shown in FIG. 10. The torsional angle control section 700 has the same configuration as the configuration of removing the friction compensating section 230 and the adding section 271 from the configuration example of the turning angle control section 200 shown in FIG. 6. The torsional angle control section 700 inputs the target torsional angle Δθref and the torsional angle Δθ instead of the target turning angle θtref and the turning angle θt. A torsional angle feedback (FB) compensating section 710, a torsional angular velocity calculating section 720, a velocity control section 740, an output limiting section 750 and a subtracting section 770 have the same configurations and perform the same operations as the turning angle FB compensating section 210, the turning angular velocity calculating section 220, the velocity control section 240, the output limiting section 250 and the subtracting section 270 respectively, and the torsional angle control section 700 outputs the current command value Imc.

The subtracting section 910, the current control section 800, the PWM-control section 920, the inverter 930 and the motor current detector 940 have the same configurations and perform the same operations as the subtracting section 410, the current control section 300, the PWM-control section 420, the inverter 430 and the motor current detector 440 respectively.

It is possible to insert a phase compensating section performing a phase compensation into a front stage (an input port of the steering angle θh) or a rear stage of the target steering torque generating section 500. The torsional angle control section 700 may control the steering torque instead of the torsional angle, input the steering torque Ts and the target steering torque Tref, and perform a control so that the steering torque Ts becomes the target steering torque Tref. In this case, the converting section 600 is not necessary.

In such a configuration, an operating example of the present embodiment will be described with reference to flowcharts of FIGS. 11 to 13.

As the operation starts, the steering angle θh, the vehicle speed Vs, the turning angle θt and the torsional angle Δθ are detected or calculated (Step S10). The steering angle θh is inputted into the target turning angle generating section 100 and the target steering torque generating section 500, and the vehicle speed Vs is inputted into the target steering torque generating section 500. Further, the turning angle θt is inputted into the turning angle control section 200, and the torsional angle Δθ is inputted into the torsional angle control section 700.

In the target turning angle generating section 100, the steering angle θh is inputted into the limiting section 110. The limiting section 110 limits the upper and lower limit values of the steering angle θh by the preset upper limit value and lower limit value (Step S20), and outputs the limited result as the steering angle θh1 to the rate limiting section 120. The rate limiting section 120 limits the change amount of the steering angle θh1 by the preset limit value (Step S30), and outputs the limited result as the steering angle θh2 to the correcting section 130. The correcting section 130 corrects the steering angle θh2 by using the notch filter, obtains the target turning angle θtref (Step S40), and outputs it to the turning angle control section 200.

The turning angle control section 200 into which the turning angle θt and the target turning angle θtref are inputted, calculates the current command value Imct (Step S50). An operating example of the turning angle control section 200 will be described with reference to the flowchart of FIG. 12. The initial value of the past current command value Imctp is set to zero.

With respect to the target turning angle θtref and the turning angle θt that have been inputted into the turning angle control section 200, the target turning angle θtref is inputted into the subtracting section 270, and the turning angle θt is inputted into the subtracting section 270 and the turning angular velocity calculating section 220 (Step S51).

The deviation $\Delta\theta t_0$ is calculated at the subtracting section 270 by subtracting the turning angle θt from the target turning angle θtref (Step S52). The deviation $\Delta\theta t_0$ is inputted into the turning angle FB compensating section 210. The turning angle FB compensating section 210 compensates the deviation $\Delta\theta t_0$ by multiplying the deviation $\Delta\theta t_0$ by the compensation value $C_{FB}$ (Step S53), and outputs the target turning angular velocity ωtref to the friction compensating section 230 and the velocity control section 240.

The turning angular velocity calculating section 220 into which the turning angle θt is inputted, calculates the turning angular velocity ωtt by the differential calculation to the turning angle θt (Step S54), and outputs it to the velocity control section 240.

In the velocity control section 240, the difference between the target turning angular velocity ωtref and the turning angular velocity ωtt is calculated at the subtracting section 243, the difference is integrated (Kvi/s) at the integrating section 242, and the integrated result is addition-inputted into the subtracting section 244 (Step S55). Further, the proportional processing (Kvp) is applied to the turning angular velocity ωtt at the proportioning section 241, and the proportioned result is subtraction-inputted into the subtracting section 244 (Step S55). The current command value Imcta being the subtracted result of the subtracting section 244 is outputted, and the current command value Imcta is inputted into the adding section 271.

In the friction compensating section 230, the target turning angular velocity ωtref and the past current command value Imctp from the past value holding section 260 are inputted into the filter section 231. The filter section 231 performs the filter processing by the LPF to the target turning angular velocity ωtref and the past current command value Imctp (Step S56), and outputs the target turning angular velocity ωtref1 and the past current command value Imctp1 to the input gain section 232. The input gain section 232 respectively calculates the target turning angular velocity ωtref2 and the past current command value Imctp2 by multiplying the target turning angular velocity ωtref1 and the past current command value Imctp1 by the gain (Step S57), and outputs them to the conversion map section 233.

The conversion map section 233 converts the target turning angular velocity ωtref2 into the compensation current command value Imctc0, in accordance with the past current command value Imctp2, by using the conversion map having the characteristic shown in FIG. 8 (Step S58), and outputs the compensation current command value Imctc0 to the output gain section 234. The output gain section 234 calculates the compensation current command value Imctc by multiplying the compensation current command value Imctc0 by the gain (Step S59). The compensation current command value Imctc is inputted into the adding section 271.

The compensation current command value Imctc is added to the current command value Imcta at the adding section 271 (Step S60). The current command value Imctb being the added result is inputted into the output limiting section 250. The output limiting section 250 limits the upper and lower limit values of the current command value Imctb by the preset upper limit value and lower limit value (Step S61), and outputs the limited result as the current command value Imct (Step S62).

The current command value Imct is held in the past value holding section 260 (Step S70) and further is addition-inputted into the subtracting section 410. The deviation I2 between the current command value Imct and the motor current value Imd detected by the motor current detector 440 is calculated at the subtracting section 410 (Step S80). The deviation I2 is inputted into the current control section 300, and the current control section 300 calculates the voltage control command value Vref2 by the current control (Step S90). After that, the turning motor 31 is driven and controlled through the PWM-control section 420 and the inverter 430 on the basis of the voltage control command value Vref2 (Step S100).

In the meantime, the target steering torque generating section 500 generates the target steering torque Tref corresponding to the steering angle θh and the vehicle speed Vs by using the basic map shown in FIG. 9A or 9B (Step S110), and outputs it to the converting section 600. The converting section 600 converts the target steering torque Tref into the target torsional angle Δθref (Step S120), and outputs the target torsional angle Δθref to the torsional angle control section 700.

The torsional angle control section 700 into which the torsional angle Δθ and the target torsional angle Δθref are inputted, calculates the current command value Imc (Step S130). An operating example of the torsional angle control section 700 will be described with reference to the flowchart of FIG. 13.

With respect to the target torsional angle Δθref and the torsional angle Δθ that have been inputted into the torsional angle control section 700, the target torsional angle Δθref is inputted into the subtracting section 770, and the torsional angle Δθ is inputted into the subtracting section 770 and the torsional angular velocity calculating section 720 (Step S131).

The deviation Δθ$_0$ is calculated at the subtracting section 770 by subtracting the torsional angle Δθ from the target torsional angle Δθref (Step S132). The deviation Δθ$_0$ is inputted into the torsional angle FB compensating section 710. The torsional angle FB compensating section 710 compensates the deviation Δθ$_0$ by multiplying the deviation Δθ$_0$ by the compensation value (Step S133), and outputs the target torsional angular velocity ωref to the velocity control section 740.

The torsional angular velocity calculating section 720 into which the torsional angle Δθ is inputted, calculates the torsional angular velocity ωt by the differential calculation to the torsional angle Δθ (Step S134), and outputs it to the velocity control section 740.

The velocity control section 740 calculates the current command value Imca by the I-P control as with the velocity control section 240 (Step S135), and outputs it to the output limiting section 750.

The output limiting section 750 limits the upper and lower limit values of the current command value Imca by the preset upper limit value and lower limit value (Step S136), and outputs the limited result as the current command value Imc (Step S137).

The current command value Imc is addition-inputted into the subtracting section 910, and the deviation I1 between the current command value Imc and the motor current value Imr detected by the motor current detector 940 is calculated at the subtracting section 910 (Step S140). The deviation I1 is inputted into the current control section 800, and the current control section 800 calculates the voltage control command value Vref1 by the current control (Step S150). Thereafter, the reaction motor 31 is driven and controlled through the PWM-control section 920 and the inverter 930 on the basis of the voltage control command value Vref1 (Step S160).

Figure 11:
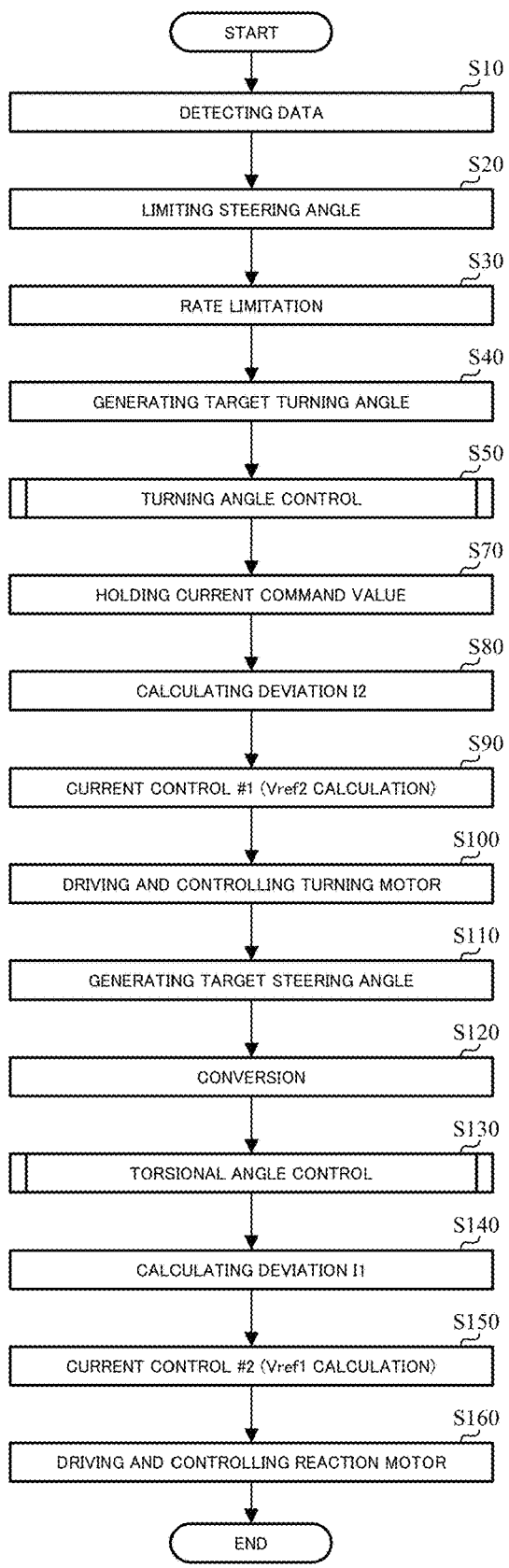
FIG. 11 is a flowchart showing an operating example of the present invention.
Figure 12:
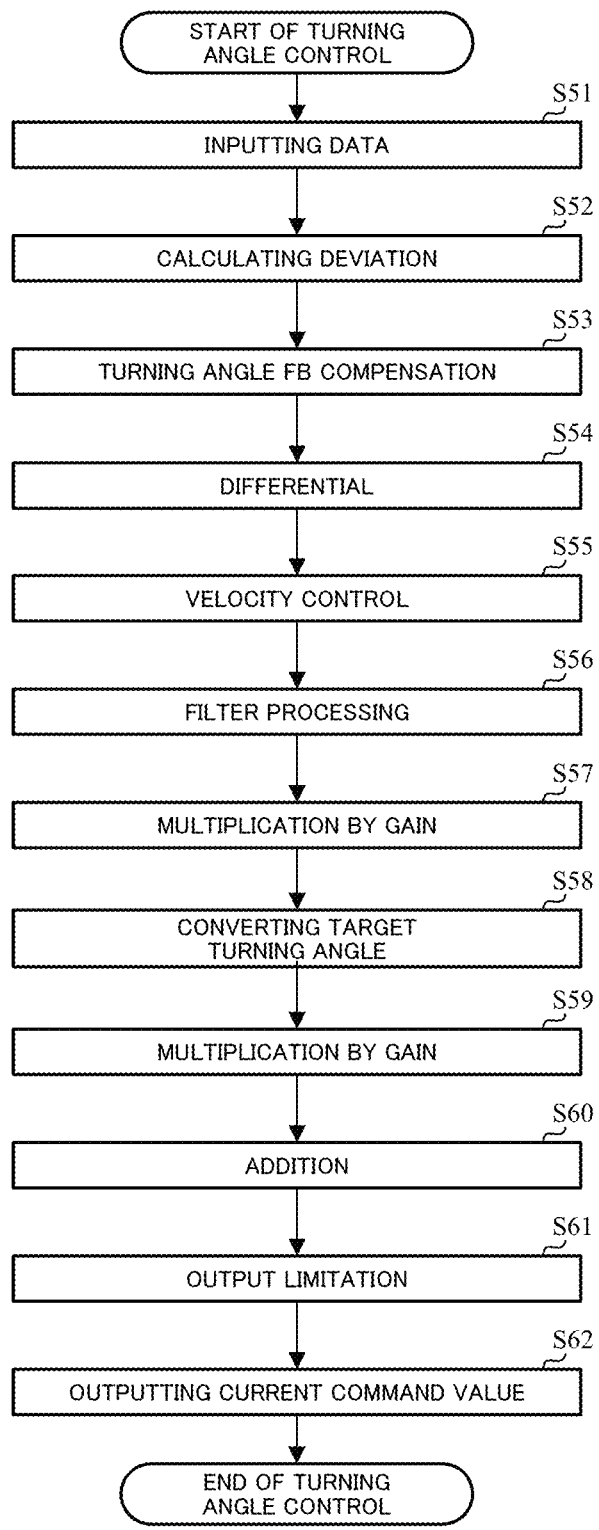
FIG. 12 is a flowchart showing an operating example (the first embodiment) of the turning angle control section.
Figure 13:
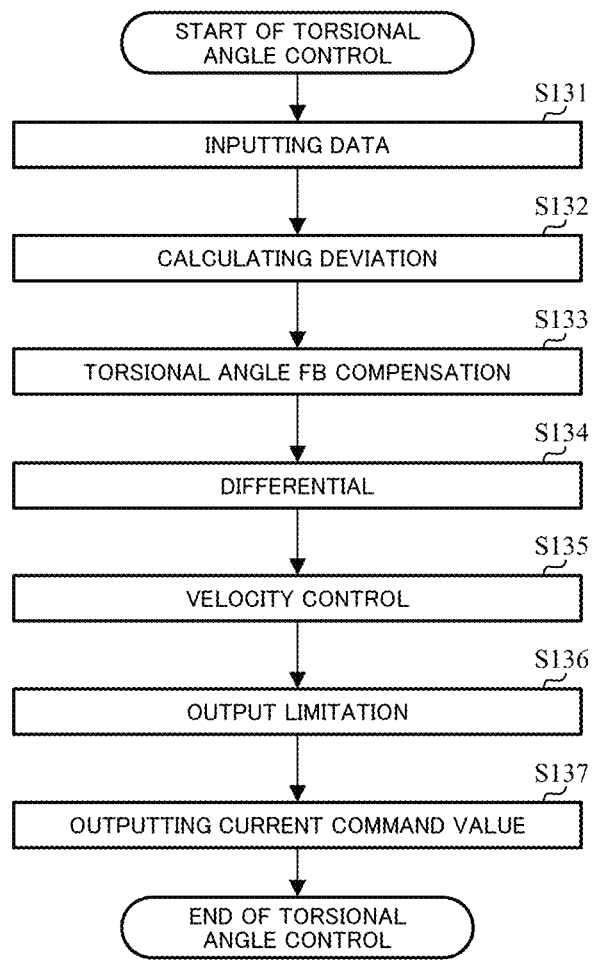
FIG. 13 is a flowchart showing an operating example of the torsional angle control section.

Each order of the data inputs, the calculations and so on in FIGS. 11 to 13 is appropriately changeable.

Although the above correcting section 130 in the target turning angle generating section 100 corrects the steering angle θh by using the notch filter, it may correct the steering angle θh by other methods. For example, it is possible to use a ratio (a virtual stroke ratio) of the target turning angle to the steering angle as a virtual value of a stroke ratio that shows a movement amount of a rack per rotation of the steering wheel, and correct the steering angle so that the virtual stroke ratio becomes variable. Specifically, the correcting section appropriately changes the virtual stroke ratio, and obtains the target turning angle θtref by multiplying the steering angle θh2 by the changed virtual stroke ratio. Although the virtual stroke ratio is usually "1", increasing the virtual stroke ratio in abrupt steering enables a quick steering. It is possible to obtain the target turning angle θtref in accordance with the steering angle θh2 by using a map defining a characteristic of the target turning angle θtref to a magnitude |θh2| of the steering angle θh2 as the method of correcting the steering angle, as with the target steering torque generating section 500. Alternatively, it is possible to obtain the target turning angle θtref simply by multiplying the steering angle θh2 by a predetermined gain.

Further, the velocity control section 740 in the torsional angle control section 700 may use a control that is realizable and includes any of the P, I and D control, such as the PI control, the P control, the PID control, the PI-D control or the like, instead of the I-P control, as with the velocity control section 240 in the turning angle control section 200. The follow-up control in the turning angle control section 200 and the torsional angle control section 700 may be performed with a control structure generally used. If the structure of the turning angle control section 200 is a control structure where an actual angle (corresponding to the turning angle θt here) follows a target angle (corresponding to the target turning angle θtref here), it is not limited to a control structure used in apparatuses for vehicles. For example, it is possible to apply a control structure used in industrial electric motors such as an industrial positioning apparatus, an industrial robot and so on.

Furthermore, although the steering angle is used as the steering information in the above, a steering wheel angle detected by the upper side angle sensor or a column angle detected by the lower side angle sensor may be used as the steering information. In addition, although the past current command value Imctp is used as the driving information in the above, it is capable of using information relating to the drive of the turning motor 31 such as the motor current value Imt or the motor torque.

The effect of the friction compensation performed by the friction compensating section in the first embodiment will be described. Here, regarding the effect using the driving information for the friction compensation, the effect of the friction compensation will be conceptually described by comparing a case (hereinafter, referred to as "compensation case 1") that the friction compensation is performed without the past current command value and a case (hereinafter, referred to as "compensation case 2") that it is done with the past current command value.

Figure 14A:
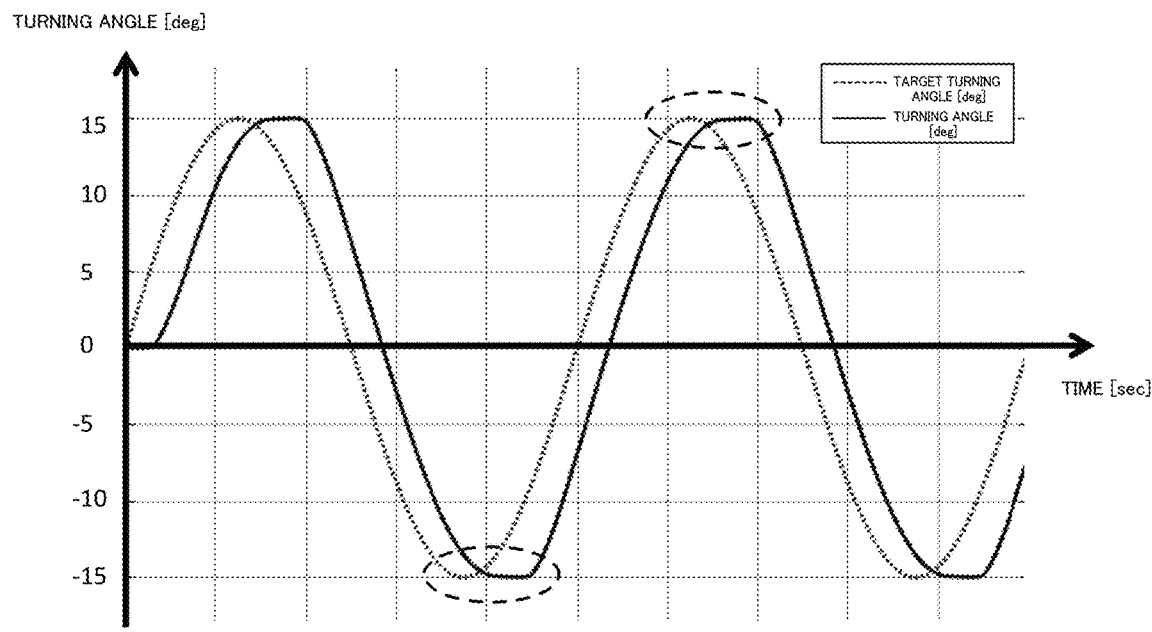
FIGS. 14A and 14B are graphs showing an example of time responses of a turning angle in the case of not performing friction compensation without a past current command value and in the case of performing it in a simulation demonstrating an effect of the friction compensation with the past current command value.

The steering angle θh is equated with the target turning angle θtref, and assuming that the driver slightly turns the steering wheel from the on-center position, a sine wave whose frequency is 1 [Hz] and whose amplitude is 15 [deg], is used. In the compensation case 1, when the target turning angle θtref is changed like the above sine wave, a delay is often occurred in the turning angle at a timing of a position, where the direction of the target turning angle turns over, surrounded by a round dashed line as shown in FIG. 14A. This reason is that: the influence of the friction force becomes great as the amplitude of the target turning angle becomes large and then the cancellation of the delay often becomes insufficient.

In FIG. 14A, the dashed line shows the time response of the target turning angle, and a solid line does the time response of the turning angle. It is the same with FIG. 14B. Further, FIG. 14A shows the time response for the compensation case 1, and FIG. 14B does the time response for the compensation case 2.

Figure 14B:
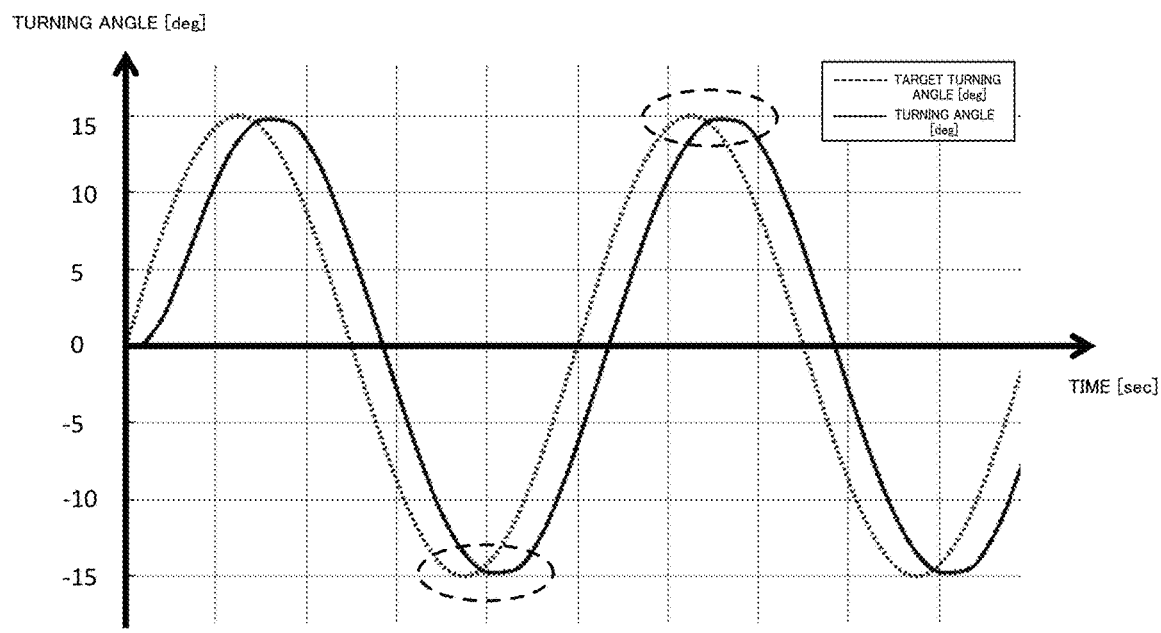

In contrast, in the case of compensation case 2, the delay in the turning angle becomes smaller than the compensation case 1 as shown in the areas surrounded with the round dashed line in FIG. 14B. Although the load (=the motor current) applied to the turning mechanism becomes large as the amplitude of the target turning angle becomes large, the compensation current command value is not changed in the compensation case 1 even if the motor current increases. In this connection, the friction compensation sufficiently cannot satisfy the influence of the friction force, and the delay after when the amplitude becomes the maximum becomes a large wave. Alternatively, in the compensation case 2, the compensation current command value at a time point when the amplitude becomes the maximum or when the target turning angular velocity becomes small becomes large as shown in FIG. 8 in a case that the past current command value is large. Consequently, since the compensation current command value increases in sensitive to the increasing of the load applied to the turning mechanism, it is possible to cancel the influence of the friction force with the friction compensation. Thereby, the delay is eliminated and the soft turning back is capable.

In FIG. 8, in similar to the small area where the target turning angular velocity is small even the area where the target turning angular velocity is large, the larger the past current command value is, the larger the compensation current command value is. The main friction occurrence position is an engaging section of a worm wheel and a worm shaft in the reduction mechanism. In a case that the friction at the above engaging section is large, the torque to be generated by the turning motor becomes large. The target turning angle and the target turning angular velocity also become large when the torque becomes large. Consequently, even if the driver rapidly and widely steers the steering wheel, it is possible to sufficiently compensate the friction by outputting the compensation current command value in sensitive to the increasing of the load applying to the turning mechanism.

Figure 15:
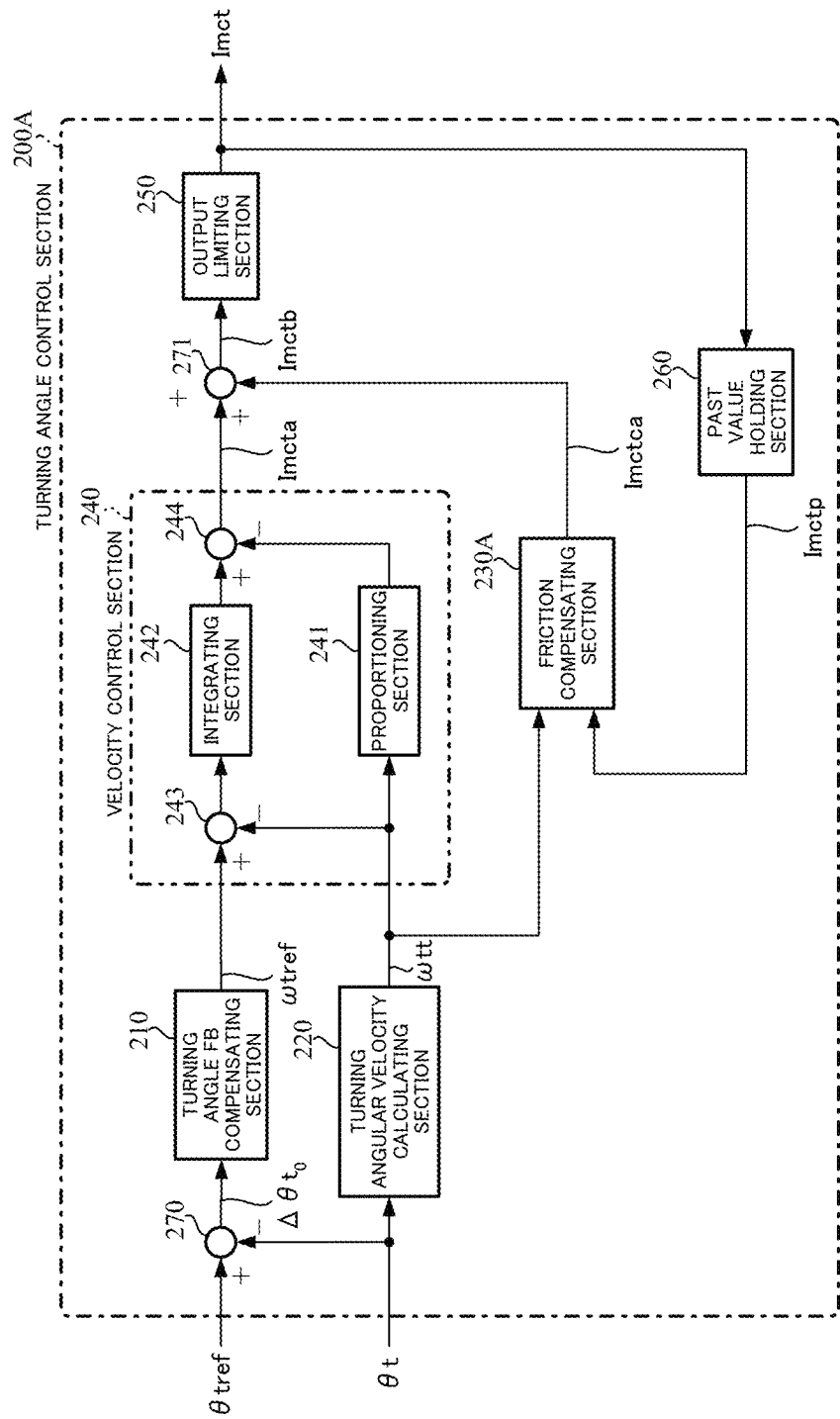
FIG. 15 is a block diagram showing a configuration example (the second embodiment) of the turning angle control section.

Although the friction compensating section in the first embodiment uses the target turning angular velocity as the velocity information, it can also calculate the compensation current command value on the basis of the turning angular velocity and the past current command value by using the turning angular velocity as the velocity information. A configuration example (the second embodiment) of a turning angle control section in this case is shown in FIG. 15. Compared with the turning angle control section 200 of the first embodiment shown in FIG. 6, the turning angular velocity ωtt outputted from the turning angular velocity calculating section 220 instead of the target turning angular velocity ωtref is inputted into a friction compensating section 230A, where a compensation current command value Imctca is outputted, in a turning angle control section 200A of the second embodiment.

Although a configuration and an operation of the friction compensating section 230A are the same as those of the friction compensating section 230 in the first embodiment, the friction compensating section 230A operates on not the target turning angular velocity ωtref but the turning angular velocity ωtt, so that the cutoff frequency of the LPF in the filter section, the gain of the input gain section, and the gain of the output gain section are adjusted to appropriate values accordingly.

With respect to an operating example of the second embodiment, the flow of input data into the friction compensating section of the turning angle control section is only changed as described above, and others are the same as the operating example of the first embodiment.

Although one control apparatus performs the turning control and the reaction control in the above embodiments, it is possible to provide a control apparatus for the turning control and a control apparatus for the reaction control respectively. In this case, the apparatuses transmit and receive data with each other by communication. Further, although the SBW system shown in FIG. 1 does not have a mechanical connection between the reaction force apparatus 40 and the turning apparatus 30, the present invention can be applied also to an SBW system that includes a mechanical torque transmission mechanism which mechanically connects the column shaft 2 with a turning mechanism by using a clutch or the like when an abnormality occurs in the system. Such an SBW system makes the mechanical torque transmission open by turning off the clutch when the system is normal, and makes the mechanical torque transmission possible by turning on the clutch when the system is abnormal. Although the reaction force apparatus 40 includes the torsion bar, the torsion bar may not be limited to if the substitute is a mechanism having an arbitrary spring constant between the steering wheel 1 and the reaction motor 41. If operating in cooperation with the turning apparatus 30, a reaction force apparatus without the torsion bar or the like may be used.

The drawings used above are conceptual diagrams to describe the present invention qualitatively, and are not limited to. The above embodiments are preferred embodiments of the present invention, but are not limited to, and are variously deformable without departing from the summary of the present invention.

A main object of the present invention relates to a realizing means to compensate the follow-up delay of the turning angle against the target turning angle caused by the friction. With respect to a realizing means of the followability of the turning angle to the target turning angle, the above turning angle control section may not be limited to.

EXPLANATION OF REFERENCE NUMERALS 1 steering wheel (handle)
2 column shaft (steering shaft, handle shaft)
10 vehicle speed sensor
30 turning apparatus
31 turning motor
32, 42 reduction mechanism
33 angle sensor
40 reaction force apparatus
41 reaction motor
43 steering angle sensor
50 control apparatus
100 target turning angle generating section
110 limiting section
120 rate limiting section
130 correcting section
200, 200A turning angle control section
210 turning angle feedback (FB) compensating section
220 turning angular velocity calculating section
230, 230A friction compensating section
231 filter section
232 input gain section
233 conversion map section
234 output gain section
240, 740 velocity control section
250, 750 output limiting section
260 past value holding section
300, 800 current control section
420, 920 PWM-control section
430, 930 inverter
440, 940 motor current detector
500 target steering torque generating section
501 sign section
600 converting section
700 torsional angle control section
710 torsional angle feedback (FB) compensating section
720 torsional angular velocity calculating section

The invention claimed is:

1. A control apparatus of a steering system for vehicles that controls a turning mechanism by driving and controlling a turning actuator based on steering information communicated electrically, comprising:
a processor;
a target turning angle generating section, implemented by the processor, that generates a target turning angle;
a turning angle control section, implemented by the processor, that calculates a current command value to make a turning angle detected in said turning mechanism follow said target turning angle generated by said target turning angle generating section based on said steering information,
wherein said turning angle control section comprises:
a turning angle feedback compensating section, implemented by the processor, to calculate a target turning angular velocity from a deviation between said target turning angle and said turning angle;
a turning angular velocity calculating section, implemented by the processor, to calculate a turning angular velocity from said turning angle;
a velocity control section, implemented by the processor, to calculate a basic current command value based on said target turning angular velocity and said turning angular velocity;
a past value holding section, implemented by the processor, to hold a past value of said current command value and to output a past current command value; and
a friction compensating section, implemented by the processor, to calculate a compensation current command value for compensating a follow-up delay of said turning angle caused by a friction in said turning mechanism by using said target turning angular velocity and said past current command value,
wherein said turning actuator is driven and controlled by using said current command value obtained by adding said compensation current command value to said basic current command value.

2. The control apparatus of the steering system for vehicles according to claim 1,
wherein said friction compensating section comprises:
a filter section, implemented by the processor, that performs a filter processing to said target turning angular velocity and said past current command value and calculates a first target turning angular velocity being filter-processed and a first past current command value being filter-processed; and
a conversion map section, implemented by the processor, that inputs said first target turning angular velocity and said first past current command value and outputs said compensation current command value in accordance with said first target turning angular velocity.

3. The control apparatus of the steering system for vehicles according to claim 2,
wherein said filter section is a low pass filter (LPF) having a characteristic coinciding with a follow-up of said turning angular velocity to said target turning angular velocity in said velocity control section.

4. The control apparatus of the steering system for vehicles according to claim 2,
wherein said conversion map section has a characteristic that said compensation current command value becomes large and converges to a predetermined value as said first target turning angular velocity becomes large.

5. The control apparatus of the steering system for vehicles according to claim 2,
wherein said conversion map has a characteristic that said compensation current command value becomes large as said past current command value becomes large.

6. The control apparatus of the steering system for vehicles according to claim 2,
wherein said target turning angle generating section generates said target turning angle by reducing a component corresponding to a predetermined component of said turning angle in said steering information.

7. The control apparatus of the steering system for vehicles according to claim 2,
wherein said target turning angle generating section generates said target turning angle to make a virtual stroke ratio obtained in accordance with said steering information and said target turning angle variable.

8. A control apparatus of a steering system for vehicles that controls a turning mechanism by driving and controlling a turning actuator based on steering information communicated electrically, comprising:
a processor;

a target turning angle generating section, implemented by the processor, that generates a target turning angle;

a turning angle control section, implemented by the processor, that calculates a current command value to make a turning angle detected in said turning mechanism follow said target turning angle generated by said target turning angle generating section based on said steering information, wherein said turning angle control section comprises:

a turning angle feedback compensating section, implemented by the processor, to calculate a target turning angular velocity from a deviation between said target turning angle and said turning angle;

a turning angular velocity calculating section, implemented by the processor, to calculate a turning angular velocity from said turning angle;

a velocity control section, implemented by the processor, to calculate a basic current command value based on said target turning angular velocity and said turning angular velocity;

a past value holding section, implemented by the processor, to hold a past value of said current command value and to output a past current command value; and a friction compensating section, implemented by the processor, to calculate a compensation current command value for compensating a follow-up delay of said turning angle caused by a friction in said turning mechanism by using said turning angular velocity and said past current command value, wherein said turning actuator is driven and controlled by using said current command value obtained by adding said compensation current command value to said basic current command value.

9. The control apparatus of the steering system for vehicles according to claim 8, wherein said friction compensating section comprises:

a filter section, implemented by the processor, that performs a filter processing to said turning angular velocity and said past current command value and calculates a first turning angular velocity being filter-processed and a first past current command value being filter-processed; and a conversion map section, implemented by the processor, that inputs said processed target turning angular velocity and said processed past current command value and outputs said compensation current command value in accordance with said first turning angular velocity.

10. The control apparatus of the steering system for vehicles according to claim 9, wherein said filter section is a law pass filter (LPF) having a characteristic coinciding with a follow-up of said turning angular velocity to said target turning angular velocity in said velocity control section.

11. The control apparatus of the steering system for vehicles according to claim 9, wherein said conversion map section has a characteristic that said compensation current command value becomes large and converges to a predetermined value as said first turning angular velocity becomes large.

12. The control apparatus of the steering system for vehicles according to claim 9, wherein said conversion map section has a characteristic that said compensation current command value becomes large as said past current command value becomes large.

13. The control apparatus of the steering system for vehicles according to claim 8, wherein said target turning angle generating section generates said target turning angle by reducing a component corresponding to a predetermined component of said turning angle in said steering information.

14. The control apparatus of the steering system for vehicles according to claim 8, wherein said target turning angle generating section generates said target turning angle to make a virtual stroke ratio obtained in accordance with said steering information and said target turning angle variable.

\* \* \* \* \*